United States Patent
Nicholl et al.

(10) Patent No.: US 6,174,013 B1
(45) Date of Patent: Jan. 16, 2001

(54) SKIP CAR LINER

(75) Inventors: Peter R. Nicholl, Conn (CA); Richard L. Palinkas, Northfield, CT (US)

(73) Assignee: Uniroyal Chemical Company, Inc., Middlebury, CT (US)

( * ) Notice: Under 35 U.S.C. 154(b), the term of this patent shall be extended for 0 days.

(21) Appl. No.: 09/439,812

(22) Filed: Nov. 12, 1999

(51) Int. Cl.[7] .................................................. B60R 13/01
(52) U.S. Cl. .................................... 296/39.1; 105/423
(58) Field of Search ............................ 296/39.1, 39.2, 296/97.23, 184; 193/32, 2 R, 25 R; 198/956, 536; 298/1 R; 105/364; 1/423

(56) References Cited

U.S. PATENT DOCUMENTS

| | | | |
|---|---|---|---|
| 5,109,970 | * | 5/1992 | Zaborszki .......................... 193/2 R |
| 6,000,741 | * | 12/1999 | Reynolds et al. .................... 296/39.2 |
| 6,056,345 | * | 5/2000 | Stevens ............................. 296/39.2 |

FOREIGN PATENT DOCUMENTS

1594046  *  9/1990  (SU) ................................. 296/39.2

* cited by examiner

Primary Examiner—D. Glenn Dayoan
Assistant Examiner—Jason Morrow
(74) Attorney, Agent, or Firm—McCormick, Paulding & Huber LLP

(57) ABSTRACT

A skip car liner comprises a resilient elastomeric barrier which includes a backing ply adapted to hang within a skip car receptacle adjacent an inner surface of a wall of the receptacle. A plurality of parallel vertically spaced apart ribs integrally formed on the barrier project downwardly and inwardly from the inner surface of the backing ply and extend along the entire length of the ply. The ribs terminate at free ends disposed within a common plane parallel to and spaced from the inner surface of the backing ply. A horizontally spaced apart series of slits formed in each rib extend from the backing ply through the rib to and through its free end. The slits divide each rib into a plurality of discrete rib sections, each rib section being supported on the backing ply for independent deflection relative to the backing ply.

17 Claims, 1 Drawing Sheet

SKIP CAR LINER

BACKGROUND OF THE INVENTION

This invention relates in general to energy absorbing barriers and liners and deals more particularly with improvements in elastomeric liners for mine skip cars, quarry truck beds and like receptacles for receiving dumped loads of rock and ore which have been processed by disintegrating machinery.

Elastomeric energy absorbing barriers and liners have heretofore been employed for protecting the skip cars and other such receptacles to increase receptacle life and reduce equipment maintenance. The protective liners employed in skip cars, for example, usually comprise sheets of energy absorbing elastomeric material mounted adjacent the inner walls of a car receptacle to absorb impact from dropped loads. However, rough chunks of rock and ore produced by disintegrating equipment and which comprise the load are often as large as six inches (6") in diameter, have sharp edges, and tend to abrade and cut the exposed surface of an energy absorbent liner, thereby substantially reducing liner life.

Accordingly, it is the general aim of the present invention to provide an improved elastomeric skip car liner which more effectively utilizes the resilient energy absorbing characteristics of an elastomeric lining material to dissipate the energy of a falling load of rock or ore and thereby reduce liner damage from large pieces of sharp falling rock or ore to increase liner life and reduce skip car maintenance.

SUMMARY OF THE INVENTION

In accordance with the present invention, a skip car liner comprises a resilient flexible impact absorbing barrier formed from an elastomeric material and includes a vertically disposed backing ply which has an outwardly facing mounting surface, adapted to engage and generally cover at least a part of an inner surface of a skip car receptacle, and an inwardly facing impact absorbing inner surface. A plurality of vertically spaced apart and horizontally extending impact absorbing ribs are integrally connected in cantilever position to the impact absorbing inner surface of the backing ply for deflection relative to the backing ply and extend along the entire length of the ply. The cantilever ribs are downwardly and inwardly inclined away from the inner surface of the backing ply for deflection toward the ply in response to impact force when a load of rock or ore is dumped into the skip car. A mounting means is provided for supporting the liner within a skip car and generally adjacent at least a portion of an inwardly facing surface of the skip car receptacle.

DETAILED DESCRIPTION OF THE PREFERRED EMBODIMENT

Figure 1:
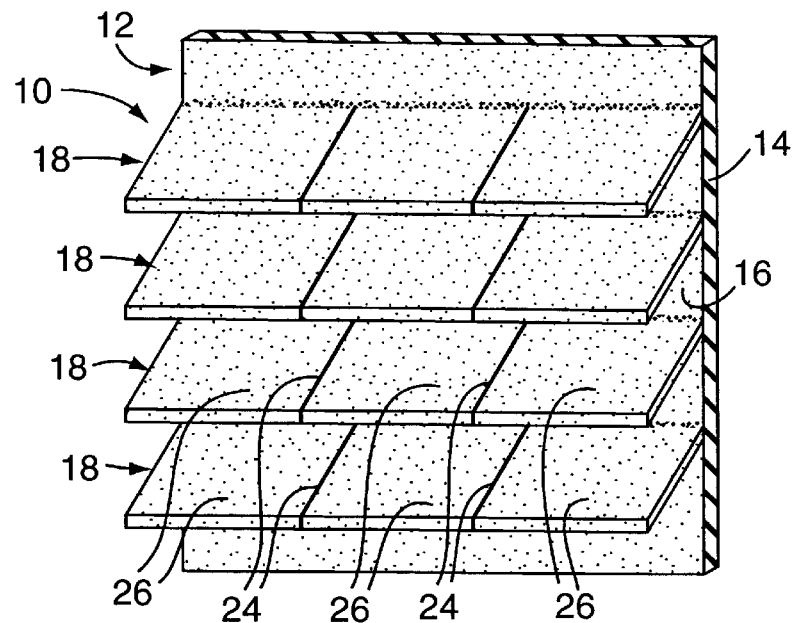
FIG. 1 is a fragmentary perspective view of a portion of a skip car liner embodying the present invention and shown partially in section.

Turning now to the drawing, a portion of a skip car liner embodying the present invention is shown in FIG. 1 and indicated generally by the reference numeral 10. The illustrated liner 10, as it appears oriented in the drawing, essentially comprises a flexible impact absorbing barrier formed from a resilient elastomeric material and includes a generally vertically disposed backing ply, indicated generally at 12 and having an outwardly facing mounting surface 14 and an inwardly facing impact absorbing surface 16. The barrier 10 further includes a plurality of vertically spaced apart and generally horizontally extending impact absorbing ribs indicated generally at 18, 18, integrally connected in cantilever position to the backing ply at the inwardly facing surface 16 and which extend along the entire length of the ply. The ribs 18, 18 are inclined downwardly and inwardly away from the impact absorbing inner surface 16 and have free ends 20, 20 which terminate generally within a common plane inward of and generally parallel to the inner surface 16. An outwardly projecting lip 22 integrally formed on the upper end of the backing ply 12 extends horizontally along the entire length of the ply for supporting the barrier on a skip car.

Figure 2:
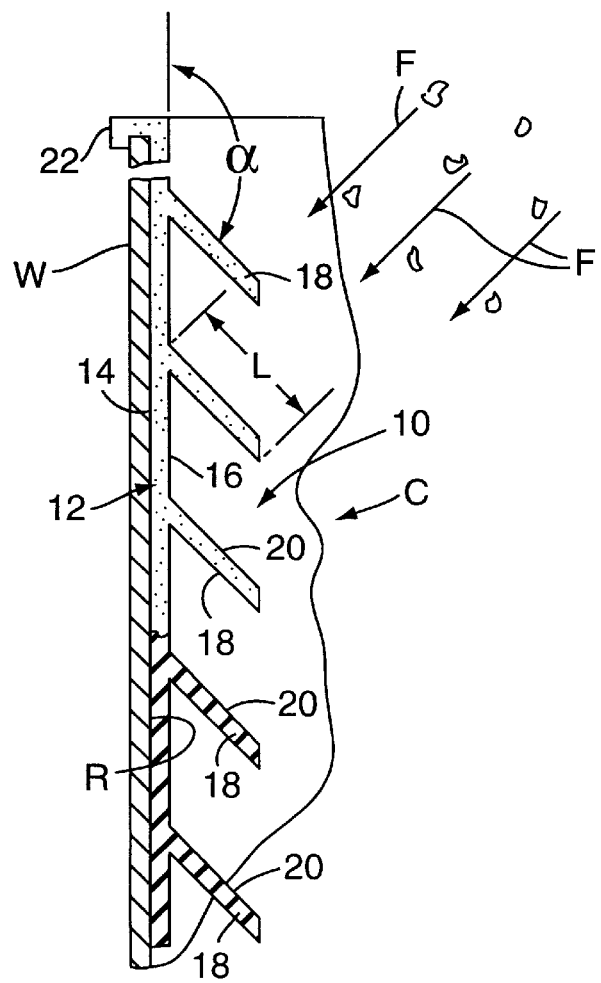
FIG. 2 a fragmentary end elevational view of the skip car liner of FIG. 1 shown supported on the wall of a skip car, the skip car wall and a portion of the liner being shown in vertical section.

FIG. 2 illustrates a typical application of the skip car liner of the present invention wherein the liner 10 is shown mounted on a wall of a skip car indicted generally by the letter C, the wall of the skip car C being designated by the letter W. The integral lip 22 is hooked over the upper edge of the wall W and supports the liner 10 in a hanging position within the skip car C and with its outwardly mounting surface 14 generally adjacent at least a portion of an interior surface of the skip car receptacle, the interior surface of the receptacle being indicated by the letter R.

Rubber and other elastomers having suitable physical characteristics may prove suitable for practicing the invention. However, polyurethane elastomer is presently preferred. The material has a hardness in the range of shore 70A to shore 60D durometer, a hardness of 95 shore A durometer being presently preferred. A typical liner is fifteen feet in length and has a height dimension of four feet and a uniform thickness of about four inches. The ribs 18, 18 are arranged in parallel relation to each other. Each rib forms an exterior angle in the range of 112 to 158 degrees with the inner surface 16 of the backing ply 12, the latter angle being indicated at α in FIG. 2. An angle α of about 135° is presently preferred. Each rib 18 has a width dimension measured from the backing ply inner surface 16 to its free end 20, the latter dimension being indicated by the letter L in FIG. 2. The vertical spacing between each rib 18 and a rib 18 immediately therebelow is at least equal to the rib width L, for a reason that will be hereinafter further explained. Preferably and as shown in FIG. 1 each of the ribs 18, 18 has a longitudinal series of slits 24, 24 therethrough which extend from the backing ply 12 to and through the rib free end 20. The slits 24, 24 divide each rib into a plurality of discrete rib sections 26, 26. Referring a(gain to FIG. 1 it will be noted that the slits 24, 24 in each rib 18 are vertically aligned with the slits 24, 24 in the ribs 18, 18 therebelow.

The presently preferred barrier 10 is preferably molded from polyurethane. The slits 24, 24 are formed in the ribs 18, 18 after the molding operation has been completed. Preferably, the slits 24, 24 are formed by an abrasive saw (not shown) and are arranged in vertical alignment with each other, as previously discussed, so that the slitting operation may be performed on a plurality of ribs with a single pass of the saw transversely of the backing ply cutting across and through the ribs.

Referring again to FIG. 2, lines of force designated by the letters F indicate the general direction of travel of a load of falling rock dumped into the skip car C. The load, which has been previously processed by disintegration equipment, may contain chunks of sharp rock as large as 6 inches in diameter.

When such a large piece of rock impinges upon the exposed upper surface of a rib section 26, that section may buckle and be deflected toward and into engagement with the backing ply 12 which further absorbs the impact of the falling rock. The vertical spacing between the ribs, which is greater than the rib width L, permits each rib section 26 to be deflected toward and into engagement with the backing ply 12 free of interference from the discrete rib section 26 immediately therebelow. Thus, the rib sections 26, 26 may function independently of each other to absorb energy from a falling load.

We claim:

1. A skip car liner comprising: a resilient flexible impact absorbing barrier formed from an elastomeric material, said barrier including a generally vertically disposed backing ply having an outwardly facing mounting surface and an inwardly facing impact absorbing inner surface, a plurality of vertically spaced apart and generally horizontally extending impact absorbing ribs integrally connected in cantilever position to said backing ply, said ribs being inclined downwardly and inwardly away from said inner surface and terminating at free ends, and mounting means for supporting said barrier within a skip car.

2. A skip car liner as set forth in claim 1 wherein said barrier is made from rubber.

3. A skip car liner as set forth in claim 1 wherein said barrier is molded from polyurethane.

4. A skip car liner as set forth in claim 1 wherein said barrier has a substantially uniform thickness.

5. A skip car liner as set forth in claim 4 wherein said free ends terminate generally within a common plane spaced inwardly of and generally parallel to said inner surface.

6. A skip car liner as set forth in claim 5 wherein said ribs are generally parallel to each other and each of said ribs has a rib width measured from said inner surface to said free end and a vertical spacing between each rib and a rib immediately therebelow is at least equal to said rib width.

7. A skip car liner as set forth in claim 6 wherein each of said ribs forms an exterior angle with said inner surface in the range of 112 degrees to 158 degrees.

8. A skip car liner as set forth in claim 1 wherein each of said ribs has a series of longitudinally spaced apart slits therethrough extending from said backing ply to and through said free end and dividing said rib into a plurality of discrete rib sections.

9. A skip car liner as set forth in claim 8 wherein said slits in each rib are vertically aligned with said slits in said ribs therebelow.

10. A skip car liner as set forth in claim 1 wherein each of said ribs forms an exterior angle with said inner surface in a range of from 112 degrees to 158 degrees.

11. A skip car liner as set forth in claim 1 wherein each of said ribs forms an exterior angle with said inner surface generally equal to 135_(one hundred thirty five degrees).

12. A skip car liner as set forth in claim 1 wherein said elastomeric material has a hardness in a range of 70A to 60D durometer.

13. A skip car liner as set forth in claim 1 wherein said elastomeric material hardness is 95A durometer.

14. A skip car liner comprising: a resilient flexible impact absorbing barrier molded from polyurethane and having a substantially uniform thickness, said barrier including a generally vertically disposed backing ply having an outwardly facing mounting surface and an inwardly facing impact absorbing inner surface, a plurality of vertically equally spaced apart and horizontally extending impact absorbing ribs integrally connected in cantilever position to said backing ply, said ribs being parallel to each other and downwardly and inwardly inclined away from said inner surface, said ribs have free ends terminating generally within a common plane spaced forwardly of and generally parallel to said inner surface, each of said ribs having a rib width measured from said inner surface to said free end, the vertical spacing between each of said ribs and a rib immediately therebelow being at least equal to said rib width, each of said ribs forming an exterior angle with said inner surface in the range of 112 to 158 degrees, each of said ribs having a longitudinal series of slits therethrough extending from said backing ply to and through said free end and dividing said rib into a plurality of discrete rib sections, said slits in each rib being vertically aligned with said slits in said ribs therebelow, and mounting means for supporting said barrier within a skip car.

15. A skip car liner as set forth in claim 14 wherein each of said ribs forms an exterior angle of about 135° (one hundred thirty five degrees) with said inner surface.

16. A skip car liner as set forth in claim 14 wherein said polyurethane has a hardness in a range of 70A to 60D durometer.

17. A skip car liner as set forth in claim 16 wherein said polyurethane hardness is 95A durometer.

* * * * *